Sept. 24, 1957   A. J. ROGER   2,807,050
HIGH PRESSURE PLASTIC INJECTION MOLDING MACHINE CLAMPS
Original Filed Dec. 19, 1949
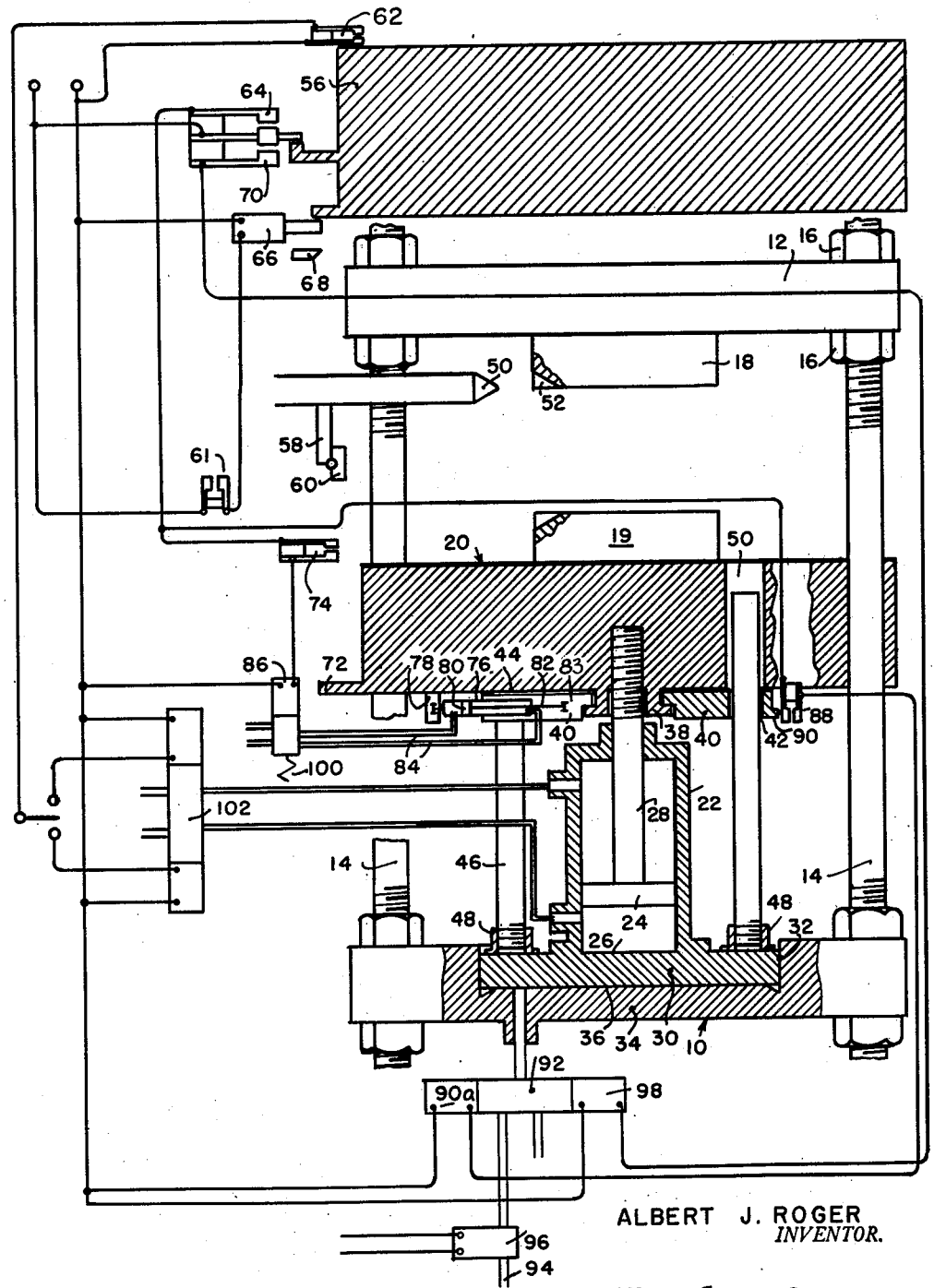
ALBERT J. ROGER
INVENTOR.
BY
Attorney

United States Patent Office 2,807,050
Patented Sept. 24, 1957

2,807,050

HIGH PRESSURE PLASTIC INJECTION MOLDING MACHINE CLAMPS

Albert J. Roger, Oakland, Calif., assignor to Crown Machine & Tool Company, Fort Worth, Tex., a corporation of Texas Substituted for abandoned application Serial No. 133,877, December 19, 1949. This application May 24, 1955, Serial No. 510,607

5 Claims. (Cl. 18—30)

This invention relates to clamps for plastic molding machines of the injection type.

It is one of the objects of this invention to provide a mold clamp which successfully accommodates molding dies of a type having cavities which are relatively deep and which have dimensions such that during injection of the plastic very large mold separating forces develop.

It is another object of this invention to provide a clamp which continuously withstands the high separating forces incident to injection, and which itself is capable of developing sufficient force to separate the mold parts from the article after the article has solidified in the mold.

It is a further object of the invention to provide for the efficient, safe, and automatic sequential operation of the various functional elements of my clamp.

Additional objects and advantages of my invention will become evident from a consideration of the following specification and accompanying drawing, in which:

The drawing is a diagram illustrating the essential details of a clamp according to the invention.

Like elements are designated by like characters throughout the specification and drawings.

In the drawing a vertical type clamp is illustrated to comprise a rigid base 10 and an upper platen 12 which are joined together rigidly by a plurality, as four, of vertical and parallel strain rods 14. Platen 12 is adjustable between pairs of nuts 16 on the rods 14. The rods 14 may be extended in a conventional manner for securement to a header plate (not shown), such header plate serving to maintain the parallel alignment of strain rods 14 when platen 12 is loosened for adjustment.

The upper platen 12 has secured thereto one part 18 of a mold die. A movable platen 20 is mounted to slide on rods 14 toward and away from platen 12 and has secured thereon a second part 19 of the mold die. A fluid actuated motor 22 comprising a piston 24 in a cylinder 26 actuates a piston rod 28 which rod supports and is secured as by threading in the platen 20 and transmits motion from piston 24 thereto. The piston 24 has a long stroke in cylinder 26, the vertical extent of which is designed to be sufficient to permit the insertion of mold parts 18 and 19 of a wide range of vertical dimensions. The diameter of piston 24 and cylinder 26 is small; being only large enough to supply adequate thrust and power to rapidly move the mold part 19 from the fully open position shown to a position contacting or nearly contacting the mold part 18.

The cylinder 22 is secured and pressure sealed to a piston 30 which is movable vertically in the direction of motion of piston 24. Piston 30 is received in a cylinder 32 provided by base 10 which base further provides a cylinder head 34 opposed to piston 30. During the vertical movements of platen 20 under compulsion of piston 24, the thrust of platen 20 is transmitted via piston 24 and the fluid in cylinder 26 to the head of piston 30, which piston head engages the surface 36 of the cylinder head 34 and receives support therefrom.

The platen 20 provides, on the lower face thereof and concentric of piston rod 28, an annular shouldered bearing 38 on which there is journalled a blocking plate 40 having, preferably, three holes 42 spaced at one hundred and twenty degree intervals therein on a circle of common radius from the center of journal 38. The plate 40 is permitted a slight vertical displacement between the shoulder of bearing 38 and the bottom flat face 44 of platen 20.

The upper surface of piston 30 carries, in addition to motor 22, three thrust rods 46 of a size to pass through openings 42 in blocking disc 40 and positioned with their axes parallel to the axes of the strain rods 14 and at one hundred and twenty degree intervals about the axis of journal 38, the radius of their center lines from the axis of journal 38 being the same as that for the location of passages 42. The thrust rods 46 are removably positioned by foot sockets 48 secured to piston 30. The platen 20 provides passages 50 in registry with sockets 48, into, or through, which the rods 46 project in the position shown in the drawing.

The apparatus described to this point is operable as follows:

From the position shown, upon admission of hydraulic fluid under adequately sustained pressure beneath piston 24, the platen 20 and mold part 19 are raised and held to contact mold part 18, the contact stopping further movement. When so moved the upper ends of rods 46 are free of holes 42 in the blocking plate 40. Plate 40 is now rotated so that holes 42 are out of registry with rods 46 and so that the body of the blocking plate is interposed between holes 50 of platen 20 and the ends of rods 46. Having so positioned blocking plate 40, the pressure in cylinder 26 may be released, though it need not be. If the pressure in cylinder 26 is released the platen 20 rests on thrust rods 46 through the plate 40, and piston 24 is idle.

To cause the interfaces of the mold parts 18 and 19 to engage each other with great force, enough sufficient to prevent flash of plastic material therebetween, fluid under pressure is admitted into cylinder 32 under piston 30. A very slight movement, if any, occurs upwardly, and the gross thrust on the die interfaces is substantially equal to the unit pressure in cylinder 32 multiplied by the area of piston 30. Thus, even though the same value of pressure be used under piston 30 as was previously used under piston 24, the gross upward thrust is greater than that of which piston 24 is capable in the ratio of the areas of the two pistons.

The combined weights of the moving parts including die 19, platen 20, and plate 40 does not usually exceed five tons and the thrust required to hold the die parts 18 and 19 closed often exceeds five hundred tons. Accordingly, the piston 24 may be made very small in thrust area and the unit pressure applied thereto may also be small. The unit pressure applied to piston 30 is selected in accordance with that to be resisted from the mold itself, and often is several thousands of pounds per square inch. The strain rods 14 and the thrust rods 46 are, of course, designed to withstand tension and compression stresses corresponding to these values of clamping pressure.

It will be noted that the rods 46 are so selected for length that their upper ends just clear the lower face of plate 40 when the die parts are in contact. Therefore, when plate 40 is interposed to block movement of platen 20 downwardly, the only relative movement of piston 30 to its cylinder that can ensue is that necessary to force plate 40 against platen 20 to compress the rods 46 and other parts interposed between piston 30 and platen 12, and to stretch rods 14 sufficiently to develop the total tensile force required to resist the compression of the piston thrust. These distances sum up to a few thousandths of an inch. Accordingly, the amount of liquid required to displace piston 30 enough to effect the required thrust is small.

The injector and molds are provided with the conventional nozzle and sprue apparatus including a nozzle 50 and seat 52. The nozzle 50 is applied when the piston 30 has been fully actuated to clamp the mold parts, and the charge of fluid plastic material is forced into die 18 and 19, thereby developing a large thrust tending to part the mold parts 18 and 19 by adding further to the stretch in the strain rods 14. If the die parts are allowed to separate ever so slightly, flash occurs and the tendency to part is increased. This spreading tendency is, however, taken up by the further extension of piston 30, sufficiently to prevent any flash from occurring. The thrust of piston 30 is preset by the use of conventional pressure regulation to adequately exceed the injection pressure thrust. After injection, and after a time interval for cooling the molding, the nozzle is withdrawn; but the clamping pressure may, though it need not, be relieved immediately after the injection stroke of the injection piston has been completed with the resultant release of separating pressure from the inside of the mold.

It is to be observed that the clamping pressure over the flat interfaces of the mold parts 18 and 19 tend to be uniform. This tendency is due to the employment of three thrust rods 46 and to the fact that the piston 30, being relatively thin, adjusts itself very slightly with respect to its own thrust axis so that the thrusts in the three thrust rods are equal and cause the platen 20 to rock slightly, for which its guides are sufficiently loose, so that the interfaces of the two die parts are substantially unrestrained from uniform interfacial contact. It is to be understood, of course, that the various parts are machined as accurately as possible to obtain the nearest possible uniformity of pressure without the automatic equalization provided by the piston 30 and thrust rods 46 and that the slight angular adjustment afforded by the piston absolutely insures the uniform distribution of contact pressure referred to. Accurate adjustment is further facilitated by threading rods 46 into sockets 48.

After the molding has cooled, pressure under piston 24 is maintained or restored, and the pressure under piston 30 is removed. Thus plate 40 is released and is rotated for registry of holes 42 with the upper ends of rods 46. The pressure under piston 24 is then released and pressure is applied to the upper side of piston 28 to cause lowering of the platen 20 and separation of the mold parts.

The sequence of operations as above recited is insured and certain safety functions are accomplished by a series of interlocking controls which will now be described insofar as the present invention adds to or modifies machines heretofore in use.

The apparatus comprises a conventional type of gate 56, which is, for clarity, illustrated apart from its normal position across access openings between strain rods 14 to the mold areas. The gate 56 controls three circuits. When gate 56 is fully closed, switches 62 and 64 are closed and the gate is latched closed by a solenoid released latch 66. Upon release of latch 66, the gate moves a short distance under the action of gravity or equal, toward opening position, but remains sufficiently closed as to deny access of the operator to the forbidden areas. In this position the gate is stopped by a manually releasable catch 68. While so held by catch 68, switch 64 is open and switches 62 and 70 are closed. When the operator releases catch 68 to open the gate, switch 62 opens and switch 70 remains closed. The purposes of these switches will be pointed out hereinafter.

The apparatus further comprises the movable injector having the nozzle 50 which moves into contact with the nozzle seat 52 for injection purposes after the clamping has been effected by piston 30. The injector carries therewith a switch actuator arm 58 to which there is pivoted a switch actuating pawl 60. Pawl 60 closes switch 61 upon retraction of the injector (movement of nozzle 50 to the left in the drawing), the result of which activity will be recited and explained hereafter.

The platen 20 carries an arm 72 which engages a blocking disc drive control switch 74 when piston 24 reaches its maximum movement such as to permit free rotation of blocking disc 40.

Means are provided to rotate the blocking disc into and out of the blocking position. The means illustrated includes a cylinder 76 having one end pivotally mounted to pivot on a vertical axis, on a lug 78 carried on platen 20, the axis of the cylinder 76 being horizontal. A piston 80 having a piston rod 82 has one end pivoted to a pivot pin 83 secured to the blocking disc 40. The construction is such that the piston 80 in its movement in cylinder 76 produces the required rotation for blocking and releasing the thrust rods 46 with respect to platen 18 by means of the plate 40. The driving of piston 80 is effected by fluid under pressure passing to one or the other of the two sides of piston 80 via flexible conduits 84 and via a solenoid actuated valve 86 to which there are connected a source of fluid under pressure and a conduit for allowing escape of fluid from either side of piston 80. As shown, energization of solenoid valve 86 upon closure of switch 74 is intended to move the piston 80 and plate 40 to blocking position. A clamping thrust control switch 88 is carried by platen 20 in a position to be closed by a finger 90, carried by plate 40, when the plate has moved to close the recess 50 against entry by thrust rods 46. Switch 88, upon closure energizes a solenoid 90a of a clamping thrust control valve 92 which admits high pressure hydraulic fluid into cylinder 32 and causes piston 30 to exert its clamping force on the dies through the rods 46, plate 40, and platen 20. Responsive to a source of hydraulic fluid under pressure 94, which is applied to piston 30 in effecting the clamping action, is a pressure responsive switch 96 which closes a circuit 98 when the pressure acting on the clamp suddenly rises due to the engagement of the mold parts with more than the required clamping thrust. Circuit 98 is associated with apparatus which changes the pressure producing pumping rate so as to maintain the required pressure, and the circuit also is associated with apparatus which upon closure of that circuit initiates, or conditions, apparatus for driving the injector nozzle and producing the injection, the pressure under piston 30 being maintained until the injection stroke of the injection piston has been effected. The apparatus and control of the injection phase are not described in detail here because they are a part of the prior art and are well known.

When injection has been completed, pressure is relieved at nozzle 50 and it is retracted. This causes pawl 60 to close switch 61, thus releasing solenoid latch 66 and allowing a slight drop of gate 56 to be stopped by manually releasable catch 68. This movement of gate 56 also opens switch 64 to deenergize solenoid 90a and closes switch 70 which energizes solenoid 90a and releases the hydraulic fluid from beneath piston 30 via valve 92. Clamping pressure is thereby removed from the mold, platen 20, and blocking plate 90. At this time the pressure under piston 26 remains or is reestablished so as to lift plate 40 from the top ends of thrust rods 46. Since the circuit through the solenoid valve 86 has been opened at switch 64, the solenoid valve 86 is reversed by spring 100 and causes piston 80 to move the blocking disc 40 to register holes 42 with recesses 50. The piston 24 remains up for some time for cooling the molded article so that ample time is allowed for the plate 40 to move to the non-blocking position. After sufficient time for cooling has been allowed, solenoid valve 102 is actuated to release fluid from below piston 24 and to apply separating pressure above piston 24. The platen 20 and related parts are thereby forced to the position shown in the drawing. Thereupon the operator releases gate catch 68 and the gate 56 opens thus disabling the timing controls for the injection apparatus proper.

The apparatus is adequate for molding articles of large area requiring large clamping thrusts where the resulting articles does not tend to hold the mold closed with a great deal of tenacity.

Whereas I have shown and described a preferred embodiment of my invention, I wish it to be understood that there are modifications to the invention which will be apparent to those skilled in the art and which will fall within the scope and spirit of the invention. The scope of the invention, therefore, should be limited only by the scope of the hereinafter appended claims.

This application is a substitute application for my application, Serial No. 133,877 filed December 19, 1949 and now abandoned.

I claim:

1. An injection molding machine comprising, in combination, a stationary platen for holding a first mold part in a stationary position, a plurality of tie rods secured in parallelism to said stationary platen extending substantially beyond the position of the stationary mold part, a header secured to the tie rods to form, between the header and the stationary platen, a substantial space for the operation and occupancy of moving parts of the machine between a retracted position adjoining the header and a molding position adjoining the first platen, means providing a first cylinder and piston assembly in said space, means providing a second piston and cylinder assembly between said first assembly and said header, means for interconnecting said first named cylinder and piston assembly between said movable platen, and said second piston and cylinder assembly, said first named assembly having a relatively long stroke with a relatively small piston, said second assembly having a relatively short stroke, and a relatively large piston whereby said second assembly is effective to apply a powerful mold closing force to said movable platen after advancement of said movable platen by said first named assembly, and a plurality of compression members carried by the piston of said second cylinder and piston assembly and abuttable, at the end of the stroke of said first assembly and upon application of said mold closing force, against said movable platen, thereby transmitting reactive pressure on said movable platen through said header, tie rods and stationary platen.

2. The structure of claim 1, wherein said header has a cylinder formed therein and a piston mounted in said cylinder to thereby form said second named cylinder and piston assembly.

3. The structure of claim 1, characterized by and including compression members in the form of a plurality of thrust rods carried by the piston of said second named cylinder and piston assembly and a plurality of passages in said movable platen to allow movement of the thrust rods therethrough.

4. The structure of claim 3, characterized by and including a locking plate carried by said movable platen and movable into and out of a position between said thrust rods and said passages.

5. The structure of claim 1 wherein said last named means includes thrust members supported for movement in response to admission of fluid in said second named assembly and abuttable against a locking plate mounted for limited movement on said movable platen.

References Cited in the file of this patent
UNITED STATES PATENTS

| | | |
|---|---|---|
| 1,466,490 | Swenson | Aug. 28, 1923 |
| 2,689,978 | Roger | Sept. 28, 1954 |